United States Patent
Ahn et al.

(10) Patent No.: US 11,443,134 B2
(45) Date of Patent: Sep. 13, 2022

(54) PROCESSOR FOR ACCELERATING CONVOLUTIONAL OPERATION IN CONVOLUTIONAL NEURAL NETWORK AND OPERATING METHOD THEREOF

(71) Applicant: Hyperconnect Inc., Seoul (KR)

(72) Inventors: Sang Il Ahn, Chungcheongbuk-do (KR); Sung Joo Ha, Gyeonggi-do (KR); Dong Young Kim, Incheon (KR); Beom Su Kim, Seoul (KR); Martin Kersner, Seoul (KR)

(73) Assignee: Hyperconnect Inc., Seoul (KR)

( * ) Notice: Subject to any disclaimer, the term of this patent is extended or adjusted under 35 U.S.C. 154(b) by 24 days.

(21) Appl. No.: 17/004,733

(22) Filed: Aug. 27, 2020

(65) Prior Publication Data

US 2021/0064920 A1    Mar. 4, 2021

(30) Foreign Application Priority Data

Aug. 29, 2019   (KR) .................. 10-2019-0106638

(51) Int. Cl.
   *G06K 9/62*    (2022.01)
   *G06N 3/08*    (2006.01)

(52) U.S. Cl.
   CPC ......... *G06K 9/6232* (2013.01); *G06K 9/6262* (2013.01); *G06N 3/08* (2013.01)

(58) Field of Classification Search
   CPC ...... G06K 9/6232; G06K 9/6262; G06N 3/08; G06N 3/063; G06N 3/0454; G06N 3/04
   USPC ....................................................... 382/157
   See application file for complete search history.

(56) References Cited

U.S. PATENT DOCUMENTS

| | | | |
|---|---|---|---|
| 10,762,894 B2 | 9/2020 | Sainath et al. | |
| 11,062,725 B2 | 7/2021 | Variani et al. | |
| 2019/0286953 A1* | 9/2019 | Farhadi | G06N 3/04 |
| 2019/0341052 A1 | 11/2019 | Allibhai | |
| 2020/0097818 A1* | 3/2020 | Li | G06N 3/0481 |

(Continued)

FOREIGN PATENT DOCUMENTS

| | | |
|---|---|---|
| KR | 20090015678 A | 2/2009 |
| KR | 20190007934 A | 1/2019 |

OTHER PUBLICATIONS

Amended claims application EP20193178.9 filed after receipt of European search report, dated Sep. 16, 2021. (Year: 2021).*

(Continued)

*Primary Examiner* — Juan A Torres
(74) *Attorney, Agent, or Firm* — KPPB LLP

(57) ABSTRACT

A method of performing a convolutional operation in a convolutional neural network includes: obtaining input activation data quantized with a first bit from an input image; obtaining weight data quantized with a second bit representing a value of a parameter learned through the convolutional neural network; binarizing each of the input activation data and the weight data to obtain a binarization input activation vector and a binarization weight vector; performing an inner operation of the input activation data and weight data based on a binary operation with respect to the binarization input activation vector and the binarization weight vector and distance vectors having the same length as each of the first bit and the second bit, respectively; and storing a result obtained by the inner operation as output activation data.

15 Claims, 13 Drawing Sheets

(56) References Cited

U.S. PATENT DOCUMENTS

| | | | |
|---|---|---|---|
| 2020/0210759 A1* | 7/2020 | Chou | G06N 20/10 |
| 2020/0410318 A1* | 12/2020 | del Mundo | G06N 3/0454 |
| 2021/0074270 A1 | 3/2021 | Ahn | |
| 2021/0089871 A1* | 3/2021 | Han | G06F 7/544 |
| 2021/0166106 A1* | 6/2021 | Ghasemzadeh | G06N 3/0454 |

OTHER PUBLICATIONS

Amended including specification application KR1020190106638 Korean Paten Office Jun. 28, 2021 (Year: 2021).*

Extended European Search Report for European Patent Application No. 20193178.9, dated Feb. 12, 2021.

Liang Shuang et al., "FP-BNN: Binarized neural network on FPGA", Neurocomputing, Elsevier, vol. 275, Oct. 18, 2017.

Umuroglu Yaman et al., "Work-in-progress: Towards Efficient Quantized Neural Network Inference on Mobile Devices" 2017 International Conference on Compilers, Architectures and Synthesis for Embedded Systems, Oct. 15, 2017.

Meghan Cowan et al., "Automating Generation of Low Precision Deep Learning Operators", Oct. 25, 2018.

Sparsh Mittal; "A survey of FPGA-based accelerators for convolutional neural networks", col. 32, No. 4, p. 1109-1139 dated Oct. 6, 2018.

Office Action for Korean Patent Application No. 10-2019-0106638 dated Feb. 26, 2021.

Taylor Simons et al., "Review of Binarized Neural Networks", Electronics (Jun. 12, 2019).

Office Action issued in Korean Patent Application No. 10-2019-0130044, dated Aug. 18, 2020, 8 Pgs.

"TFLite Model Benchmark Tool," 2018-2019, Retrieved from https://github.com/tensorflow/tensorflow/tree/r1.13/tensorflow/lite/tools/benchmark/, printed Apr. 26, 2022.

"Tensorflow Profiler," Obtained from https://github.com/tensorflow/profiler/blob/master/README.md on Apr. 27, 2022, Last comment Nov. 7, 2020, 3 pages.

Abadi et al., "TensorFlow: a System for Large-scale Machine Learning," Proceedings of the 12th USENIX Symposium on Operating Systems Design and Implementation (OSDI '16), Published online 2016.

Andrade et al., "A Neural Attention Model for Speech Command Recognition," arXiv preprint arXiv: 1808.08929, Published online Aug. 27, 2018.

Arik et al., "Convolutional Recurrent Neural Networks for Small-footprint Keyword Spotting," Proceedings of the Annual Conference of the International Speech Communication Association (INTERSPEECH), Published online 2017.

Arik et al., "Fast Spectrogram Inversion Using Multi-head Convolutional Neural Networks," arXiv preprint arXiv:1808.06719, Published online Nov. 6, 2018.

Chen et al., "Small-footprint Keyword Spotting Using Deep Neural Networks," Proceedings of the IEEE International Conference on Acoustics, Speech and Signal Processing (ICASSP), https://doi.org/10.1109/ICASSP.2014.6854370, Published online 2014.

Choi et al., "Convolutional Recurrent Neural Networks for Music Classification," Proceedings of the IEEE International Conference on Acoustics, Speech and Signal Processing (ICASSP), Published online Dec. 21, 2016.

Choi et al., "Temporal Convolution for Real-Time Keyword Spotting on Mobile Devices," arXiv:1904.03814v1, Apr. 8, 2019, 5 pgs.

He et al., "Deep Residual Learning for Image Recognition," Proceedings of the IEEE/CVF Conference on Computer Vision and Pattern Recognition (CVPR), Published online Dec. 10, 2015.

Howard et al., "MobileNets: Efficient Convolutional Neural Networks for Mobile Vision Applications," arXiv preprint arXiv:1704.04861, Published online Apr. 17, 2017.

Ioffe et al., "Batch Normalization: Accelerating Deep Network Training by Reducing Internal Covariate Shift," Proceedings of the Internal Conference on Machine Learning (ICML), Published online Mar. 2, 2015.

Kao et al., "Sub-Band Convolutional Neural Networks for Small-Footprint Spoken Term Classification," arXiv:1907:01448v1, Jul. 2, 2019, 5 pgs.

Lim et al., "Rare Sound Event Detection Using 1D Convolutional Recurrent Neural Networks," Proceedings of the Detection and Classification of Acoustic Scenes and Events 2017 Workshop, Published online Nov. 16, 2017.

Ma et al., "Shufflenet V2: Practical Guidelines for Efficient CNN Architecture Design," Proceedings of the European Conference on Computer Vision (ECCV), Published online 2018.

Prechelt, "Early Stopping-but When?," Neural Networks: Tricks of the trade, Springer, pp. 55-69, Published online 1998.

Sainath et al., "Convolutional Neural Networks for Small-footprint Keyword Spotting," Proceedings of the Annual Conference of the International Speech Communication Association (INTERSPEECH), Published online 2015, 5 pgs.

Sandler et al., "Mobilenetv2: Inverted Residuals and Linear Bottlenecks," Proceedings of the IEEE/CVF Conference on Computer Vision and Pattern Recognition (CVPR), Published online 2018.

Sigtia et al., "Efficient Voice Trigger Detection for Low Resource Hardware," Proceedings of the Annual Conference of the International Speech Communication Association (INTERSPEECH), https://www.iscaspeech.org/archive/Interspeech_2018/abstracts/2204.html, Published online 2018.

Sun et al., "Compressed Time Delay Neural Network for Small-footprint Keyword Spotting," Proceedings of the Annual Conference of the International Speech Communication Association (INTERSPEECH), Published Online 2017.

Tan et al., "Mnas-net: Platform-aware Neural Architecture Search for Mobile," arXiv preprint arXiv:1807.11626, Published online May 29, 2019.

Tang et al., "Deep Residual Learning for Small-footprint Keyword Spotting," Proceedings of the IEEE International Conference on Acoustics, Speech and Signal Processing (ICASSP), Published online Sep. 21, 2018, pp. 5484-5488.

Tucker et al., "Model Compression Applied to Small-footprint Keyword Spotting," Proceedings of the Annual Conference of the International Speech Communication Association (INTERSPEECH), Published Online 2016.

Wang et al., "Small-footprint Keyword Spotting Using Deep Neural Network and Connectionist Temporal Classifier," arXiv preprint arXiv:1709.03665, Published online Sep. 12, 2017.

Warden, "Launching the Speech Commands Dataset," https://ai.googleblog.com/2017/08/launching-speech-commands-dataset.html, Published online Aug. 2017.

Zhang et al., "Hello Edge: Keyword Spotting on Microcontrollers," arXiv preprint arXiv:1711.07128, Published online Feb. 14, 2018.

* cited by examiner

FIG. 4
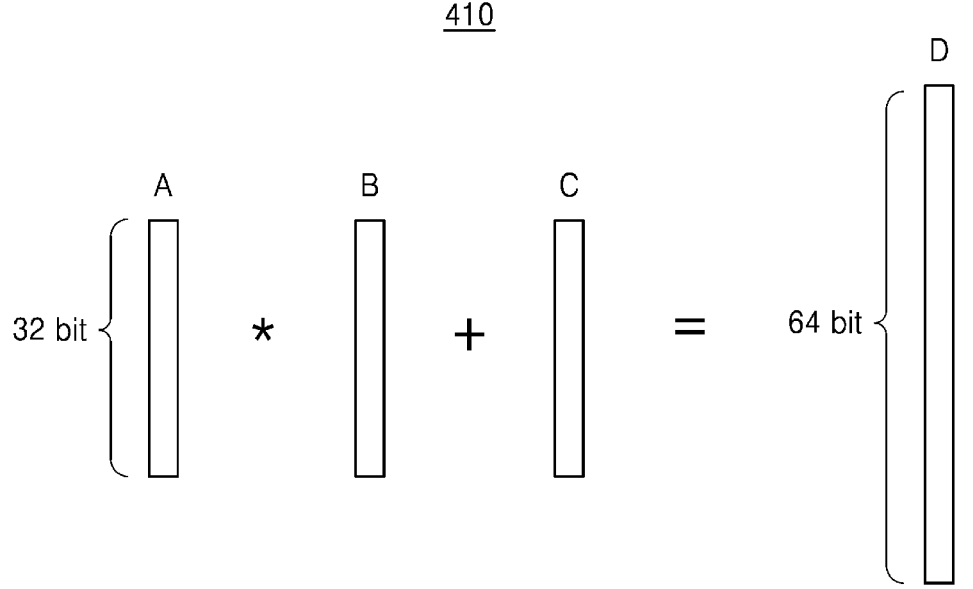
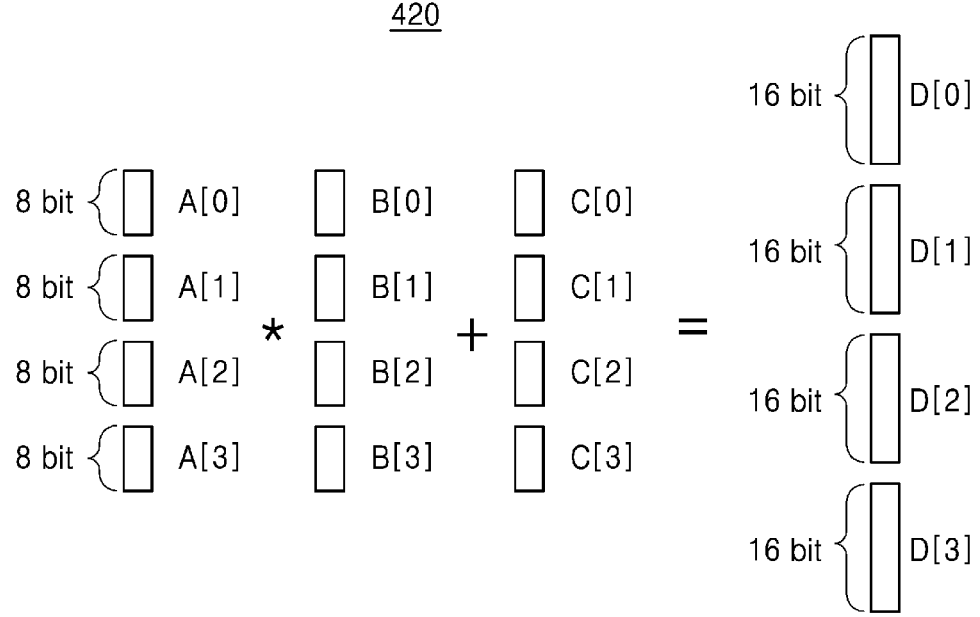

| 1 | For i=0 to 7: |
| 2 | load output activation $O_B[0] \sim O_B[7]$ |
| 3 | load output activation $O_B[8] \sim O_B[15]$ |
| 4 | load input activation $I_{SB}[i][0] \sim I_{SB}[i][15]$ |
| 5 | MAC ($I_{SB}[i][0] \sim I_{SB}[i][7]$, $W_{SBx8}[i]$, $O_B[0] \sim O_B[7]$) |
| 6 | MAC ($I_{SB}[i][8] \sim I_{SB}[i][15]$, $W_{SBx8}[i]$, $O_B[8] \sim O_B[15]$) |
| 7 | Store output activation $O_B[0] \sim O_B[7]$ |
| 8 | Store output activation $O_B[8] \sim O_B[15]$ |

| | |
|---|---|
| 1 | load output activation $O_B[0] \sim O_B[7]$ |
| 2 | load output activation $O_B[8] \sim O_B[15]$ |
| 3 | For i=0 to n-1: |
| 4 |   For j=0 to m-1: |
| 5 |     load input activation $I_{SB2}[0][i] \sim I_{SB2}[15][i]$ |
| 6 |     M0 = XNOR ($W_{SB2}[j]$, $I_{SB2}[0][i] \sim I_{SB2}[7][i]$) |
| 7 |     M1 = XNOR ($W_{SB2}[j]$, $I_{SB2}[8][i] \sim I_{SB2}[15][i]$) |
| 8 |     P0 = popcount(M0) |
| 9 |     P1 = popcount(M1) |
| 10 |     MAC (P0, $D_{X8}[i][j]$, $O_B[0] \sim O_B[7]$) |
| 11 |     MAC (P1, $D_{X8}[i][j]$, $O_B[8] \sim O_B[15]$) |
| 12 | Store output activation $O_B[0] \sim O_B[7]$ |
| 13 | Store output activation $O_B[8] \sim O_B[15]$ |

FIG. 10

Input activation data's bit: 1 bit → distance vector $d_a = [1]$

Weight data's bit: 1bit → distance vector $d_w = [1]$ —1010

$A_{original} = [1, 1, 1, 1, -1, -1, 1, -1]$, $W_{original} = [-1, 1, -1, 1, -1, 1, -1, 1]$ —1020

$A_{bin} = [1, 1, 1, 1, 0, 0, 1, 0]$, $W_{bin} = [0, 1, 0, 1, 0, 1, 0, 1]$ —1030

$M = A_{bin}$ XNOR $W_{bin} = [0, 1, 0, 1, 1, 0, 0, 0]$ → P = popcount (M) = 3 —1040

$d[0]$ × (2 × popcount($A_{bin}$ XNOR $W_{bin}$) − length)
= 1 × (2 × 3 − 8)
= −2 —1050

FIG. 11

Input activation data's bit: 2 bit → distance vector $d_a$ = [1, 2]

Weight data's bit: 1bit → distance vector $d_w$ = [1]
— 1110

$A_{original}$ = [1, 3, 3, 1, −3, −1, 1, −1], $W_{original}$ = [−1, 1, −1, 1, −1, 1, −1, 1]
— 1120

$A_{bin}$ = [ $10_{(2)}$, $11_{(2)}$, $11_{(2)}$, $10_{(2)}$, $00_{(2)}$, $01_{(2)}$, $10_{(2)}$, $01_{(2)}$ ]
→ $A_{bin}$ [0]= [0, 1, 1, 0, 0, 1, 0, 1]
→ $A_{bin}$ [1]= [1, 1, 1, 1, 0, 0, 1, 0]

$W_{bin}$ = [0, 1, 0, 1, 0, 1, 0, 1]
— 1130

M[0] = $A_{bin}$ [0] XNOR $W_{bin}$ = [1, 1, 0, 0, 1, 1, 1, 1] → P0 = popcount (M[0]) = 6
M[1] = $A_{bin}$ [1] XNOR $W_{bin}$ = [0, 1, 0, 1, 1, 0, 0, 0] → P1 = popcount (M[1]) = 3
— 1140

$\sum_{i=0}^{1}$ d[i] x (2 x popcount($A_{bin}$ [i] XNOR $W_{bin}$ ) − length)
= 1 x (2 x 6 − 8) + 2 x (2 x 3 − 8)
= 0
— 1150

FIG. 12

Input activation data's bit: 2 bit → distance vector $d_a = [1, 2]$

Weight data's bit: 2bit → distance vector $d_w = [1, 2]$

— 1210

$A_{original} = [1, 3, 3, 1, -3, -1, 1, -1]$, $W_{original} = [-1, 1, -1, -3, 3, 1, 3, 1]$

— 1220

$A_{bin} = [10_{(2)}, 11_{(2)}, 11_{(2)}, 10_{(2)}, 00_{(2)}, 01_{(2)}, 10_{(2)}, 01_{(2)}]$
→ $A_{bin}[0] = [0, 1, 1, 0, 0, 1, 0, 1]$
→ $A_{bin}[1] = [1, 1, 1, 1, 0, 0, 1, 0]$ $W_{bin} = [01_{(2)}, 10_{(2)}, 01_{(2)}, 00_{(2)}, 11_{(2)}, 10_{(2)}, 11_{(2)}, 10_{(2)}]$
→ $W_{bin}[0] = [1, 0, 1, 0, 1, 0, 1, 0]$
→ $W_{bin}[1] = [0, 1, 0, 0, 1, 1, 1, 1]$

— 1230

$M[0] = A_{bin}[0]$ XNOR $W_{bin}[0] = [0, 0, 1, 1, 0, 0, 0, 0]$ → P0 = popcount(M[0]) = 2
$M[1] = A_{bin}[0]$ XNOR $W_{bin}[1] = [1, 1, 0, 1, 0, 1, 0, 1]$ → P1 = popcount(M[1]) = 5
$M[2] = A_{bin}[1]$ XNOR $W_{bin}[0] = [1, 0, 1, 0, 0, 1, 1, 1]$ → P2 = popcount(M[2]) = 5
$M[3] = A_{bin}[1]$ XNOR $W_{bin}[1] = [0, 1, 0, 0, 0, 0, 1, 0]$ → P3 = popcount(M[3]) = 2

— 1240

$\sum_{j=0}^{1} \sum_{i=0}^{1} d[i] \times (2 \times \text{popcount}(A_{bin}[i]\ \text{XNOR}\ W_{bin}) - \text{length})$
$= 1 \times 1 \times (2 \times 2 - 8) + 1 \times 2 \times (2 \times 5 - 8) + 2 \times 1 \times (2 \times 5 - 8) + 2 \times 2 \times (2 \times 2 - 8)$
$= -12$

— 1250

PROCESSOR FOR ACCELERATING CONVOLUTIONAL OPERATION IN CONVOLUTIONAL NEURAL NETWORK AND OPERATING METHOD THEREOF

CROSS-REFERENCE TO RELATED APPLICATION

This application claims the benefit of Korean Patent Application No. 10-2019-0106638, filed on Aug. 29, 2019, in the Korean Intellectual Property Office, the disclosure of which is incorporated herein in its entirety by reference.

BACKGROUND

1. Field

The present invention relates to a processor performing a convolution operation in a convolutional neural network and an operational method thereof.

2. Description of Related Art

A Convolutional Neural Network (CNN) is a type of an Artificial Neural Network (ANN) and may be configured by stacking a plurality of layers.

An imaging system can recognize and detect images in real time through use of the CNN. The accuracy of the CNN can be increased by stacking more convolution layers. However, when more convolution layers are stacked, the number of convolution operations increases, so that the time for processing an image in the CNN may also increase. In particular, it may be difficult to process an image in real time through the CNN in a resource-restricted environment such as a mobile device.

Therefore, a technique for accelerating a convolution operation through a CNN is required even in a resource-limited environment.

SUMMARY

The object of the present invention is to increase the accuracy and speed of a convolution operation in an environment where hardware resources are limited.

Additional aspects will be set forth in part in the description which follows and, in part, will be apparent from the description, or may be learned by practice of the presented embodiments of the disclosure.

According to one aspect, a method of performing a convolutional operation in a convolutional neural network includes: obtaining input activation data quantized with a first bit from an input image; obtaining weight data quantized with a second bit representing a value of a parameter learned through the convolutional neural network; binarizing each of the input activation data and the weight data to obtain a binarization input activation vector and a binarization weight vector, respectively; performing an inner operation with respect to the input activation data and weight data based on a binary operation between the binarization input activation vector and the binarization weight vector and distance vectors having the same length as each of the first bit and the second bit, respectively; and storing a result obtained by the inner operation as output activation data.

According to another aspect, a device for performing a convolutional operation in a convolutional neural network includes: a memory in which at least one program is stored; and a processor configured to perform a convolution operation in a convolutional neural network by executing the at least one program to obtain input activation data quantized with a first bit from an input image, obtain weight data quantized with a second bit representing a value of a parameter learned through the convolutional neural network, binarize each of the input activation data and the weight data to obtain a binarization input activation vector and a binarization weight vector, respectively, perform an inner operation of the input activation data and weight data based on a binary operation between the binarization input activation vector and the binarization weight vector and distance vectors having the same length as each of the first bit and the second bit, respectively, and store a result obtained by the inner operation as output activation data.

According to another aspect, a computer program stored on a medium for executing a method of performing a convolution operation in a convolutional neural network in combination with a processor, and the method includes: loading an address to store output activation data representing a result obtained by performing an inner operation on input activation data quantized with a first bit and weight data quantized with a second bit; loading a binarization input activation vector in which components in the input activation data are binarized; performing an inner operation on the input activation data and the weight data based on a binary operation with respect to the binarization input activation vector and the binarization weight vector in which components in the weight data are binarized and distance vectors having the same length as each of the first bit and the second bit, respectively; and storing the result obtained by the inner operation as the output activation data in the loaded address.

BRIEF DESCRIPTION OF THE DRAWINGS

The above and other aspects, features, and advantages of certain embodiments of the disclosure will be more apparent from the following description taken in conjunction with the accompanying drawings, in which:

The present invention can be easily understood by combining the following detailed description and accompanying drawings, and reference numerals refer to structural elements;

FIG. 4 is a view for explaining a method of accelerating a convolution operation of data quantized with 8 bits according to an embodiment;

FIG. 6 is a view for explaining a method in which a processor performs a convolution operation through an 8-bit SIMD MAC operation according to an embodiment;

FIG. 8 is a view for explaining a method in which a processor performs a convolution operation through a predetermined binary operation according to an embodiment;

FIG. 10 is a view for explaining a process of obtaining an inner operation value when input activation data is 1 bit and weight data is 1 bit according to an embodiment;

FIG. 11 is a view for explaining a process of obtaining an inner operation value when input activation data is 2 bits and weight data is 1 bit according to an embodiment;

FIG. 12 is a view for explaining a process of obtaining an inner operation value when input activation data is 2 bits and weight data is 2 bits according to an embodiment.

DETAILED DESCRIPTION

Figure 1:
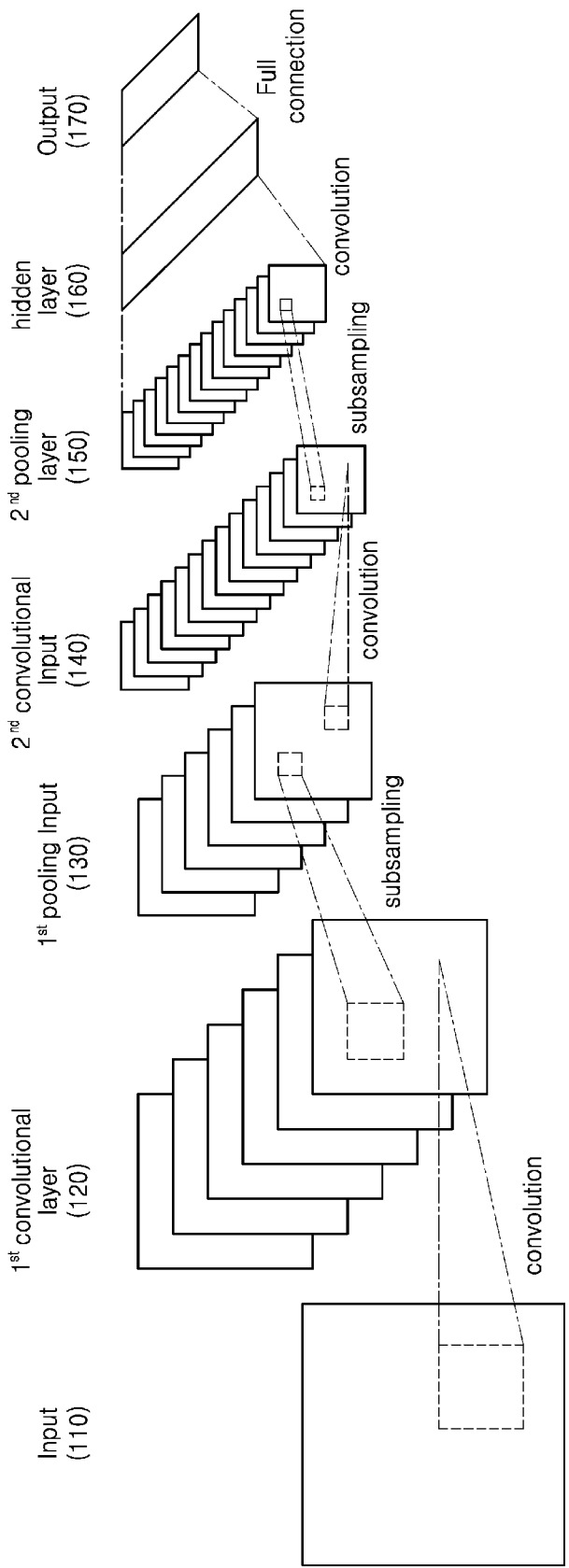
FIG. 1 is a block diagram showing a convolutional neural network according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments will be described in detail with reference to the drawings. The embodiments described below may be implemented by being modified in various different forms. In order to more clearly describe the features of the embodiments, detailed descriptions of the matters well known to those of ordinary skill in the art to which the following embodiments belong will be omitted.

On the other hand, when it is described in this specification that one configuration "includes" another configuration, this means that unless otherwise stated, other configurations may not be excluded and other configurations may be included.

Furthermore, terms including ordinals, such as "first", "second", etc., used herein may be used to describe various elements, but the elements should not be limited by those terms. The terms are used only for the purpose of distinguishing one component from other components.

FIG. 1 is a block diagram showing a convolutional neural network according to an embodiment.

Convolutional Neural Network (CNN) is one type of Artificial Neural Network (ANN), and can be mainly used to extract features of matrix data or image data. CNN may be an algorithm that learns features from input data.

On the CNN, a processor may obtain a feature by applying a filter to the input image 110 through a convolution layer 120. The processor may reduce the size by sub-sampling the filtered image through a first pooling layer 130. The processor may filter the image through a second convolution layer 140 and a second pooling layer 150 to extract features, and sub-sample the filtered image to reduce the size. Thereafter, the processor may obtain output data 170 by completely connecting the image processed through a hidden layer 160.

In the CNN, the convolution layers 120 and 140 perform a convolution operation between input activation data, which is three-dimensional input data, and weight data, which is four-dimensional data representing learnable parameters so that it is possible to obtain output activation data, which is three-dimensional output data. Here, the obtained output activation data may be used as input activation data in a next layer.

Meanwhile, since thousands of multiplication and addition operations are required to calculate one pixel on the output activation data, which is three-dimensional output data, most of the time that data is processed on the CNN is spent in the convolution layer. In FIGS. 2 to 13, an operation performed by a device or processor performing a convolution operation to accelerate a convolution operation will be described.

Figure 2:
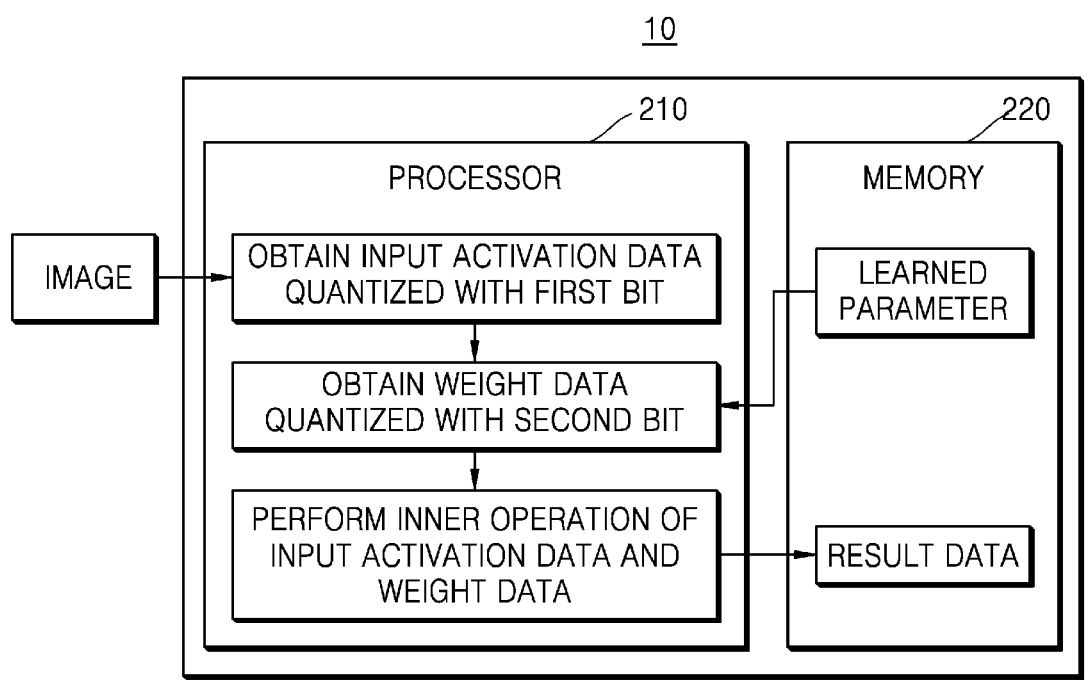
FIG. 2 is a block diagram showing a configuration of a device for performing a convolution operation according to an embodiment.

FIG. 2 is a block diagram showing a configuration of a device for performing a convolution operation according to an embodiment.

Referring to FIG. 2, a device 10 that performs a convolution operation (hereinafter, a convolution operation device) may include a processor 210 and a memory 220. Those of ordinary skill in the art related to this embodiment can understand that other general-purpose components may be further included in addition to the components shown in FIG. 2.

The processor 210 controls the overall operation of the convolution operation device 10, and may include at least one processor such as a CPU. The processor 210 may include at least one specialized processor corresponding to each function, or may be a processor integrated into one.

The memory 220 may store programs, data, or files related to convolution operations performed on the CNN. The memory 220 may store instructions executable by the processor 210. The processor 210 may execute a program stored in the memory 220, read data or a file stored in the memory 220, or store new data. Also, the memory 220 may store program instructions, data files, data structures, or the like alone or in combination.

In the processor 210, a high-precision operator (e.g., a 32-bit operator) is designed in a hierarchical structure so that it may include a plurality of low-precision operators (e.g., an 8-bit operator). In this case, the processor 210 may support an instruction for high-precision operation and a Single Instruction Multiple Data (SIMD) instruction for low precision operation. If the bit-width is quantized to fit the input of the low-precision operator, the processor 210 may accelerate a convolution operation by performing a plurality of operations with a small bit width in parallel, instead of performing an operation with a large bit width within the same time. The processor 210 may accelerate the convolution operation on the CNN through a predetermined binary operation.

The processor 210 may obtain input activation data quantized with a first bit from the input image. For example, the processor 210 may map the binary number represented by the first bit to the quantized data based on the first distance vector having the same distance as the first bit. For example, the first bit may be a bit corresponding to precision that is not supported by the processor 210. When the bits corresponding to the precision supported by the processor 210 are 32 bits, 16 bits, and 8 bits, the first bit may be any bit between 1 bit and 8 bits. The processor 210 may obtain input activation data quantized with the first bit from the image based on the mapped result and the unit of the convolution operation.

The processor 210 may obtain weight data quantized with the second bit. Here, the weight data may indicate a value of a parameter learned through the CNN. For example, the processor 210 may map the binary number represented by the second bit to the quantized data based on the second distance vector having the same distance as the second bit. For example, the second bit may be a bit corresponding to precision that is not supported by the processor 210. When the bits corresponding to the precision supported by the processor 210 are 32 bits, 16 bits, and 8 bits, the first bit may be any bit between 2 bit and 8 bits. The processor 210 may obtain weight data quantized with the second bit from the value of the parameter learned through the CNN based on the mapped result and the unit of the convolution operation. Also, the first bit may be identical to the second bit, or may be another bit.

The processor 210 may binarize each of the input activation data and the weight data to obtain a binarization input activation vector and a binarization weight vector.

For example, the processor 210 may binarize a component in the input activation data, and obtain an i-th binarization input activation vector (0≤i≤n−1, i is an integer, and the first bit is n-bit) composed of i-th bits in each of the binarized components. In addition, the processor 210 may binarize components in the weight data, and obtain a j-th binarization weight vector (0≤j≤m−1, j is an integer, and the second bit is an m-bit) composed of j-th bits in each of the binarized components.

The processor 210 may perform a binary operation between the binarization input activation vector and the binarization weight vector. The processor 210 may obtain distance vectors having the same length as each of the first bit and the second bit. The processor 210 may perform an inner operation of input activation data and weight data based on the binary operation and distance vector between the binarization input activation vector and the binarization weight vector.

For example, the processor 210 may perform an XNOR operation between the i-th binarization input activation vector and the j-th binarization weight vector to obtain n×m first operation vectors. The processor 210 may obtain n×m second operation values by performing a popcount operation on n×m first operation vectors. The processor 210 may perform an inner operation of input activation data and weight data based on a distance vector corresponding to n×m second operation values and n×m first operation vectors.

Specifically, the processor 210 may obtain n×m third operation values by multiplying each of the n×m second operation values by 2 and subtracting the length of the input activation data. The processor 210 multiplies the values of the distance vectors based on obtaining each of the n×m third operation values with the n×m third operation values, and sums the n×m multiplication values, thereby performing the inner operation of the input activation data and the weight data.

The processor 210 may obtain a predetermined number of output activation data by performing an inner operation on a predetermined number of input activation data obtained from the input image.

The processor 210 may apply a predetermined number of output activation data output from the first layer on the CNN as input activation data of the second layer on the CNN.

The processor 210 may store the result obtained by the inner operation in the memory 220 as output activation data.

Figure 3:
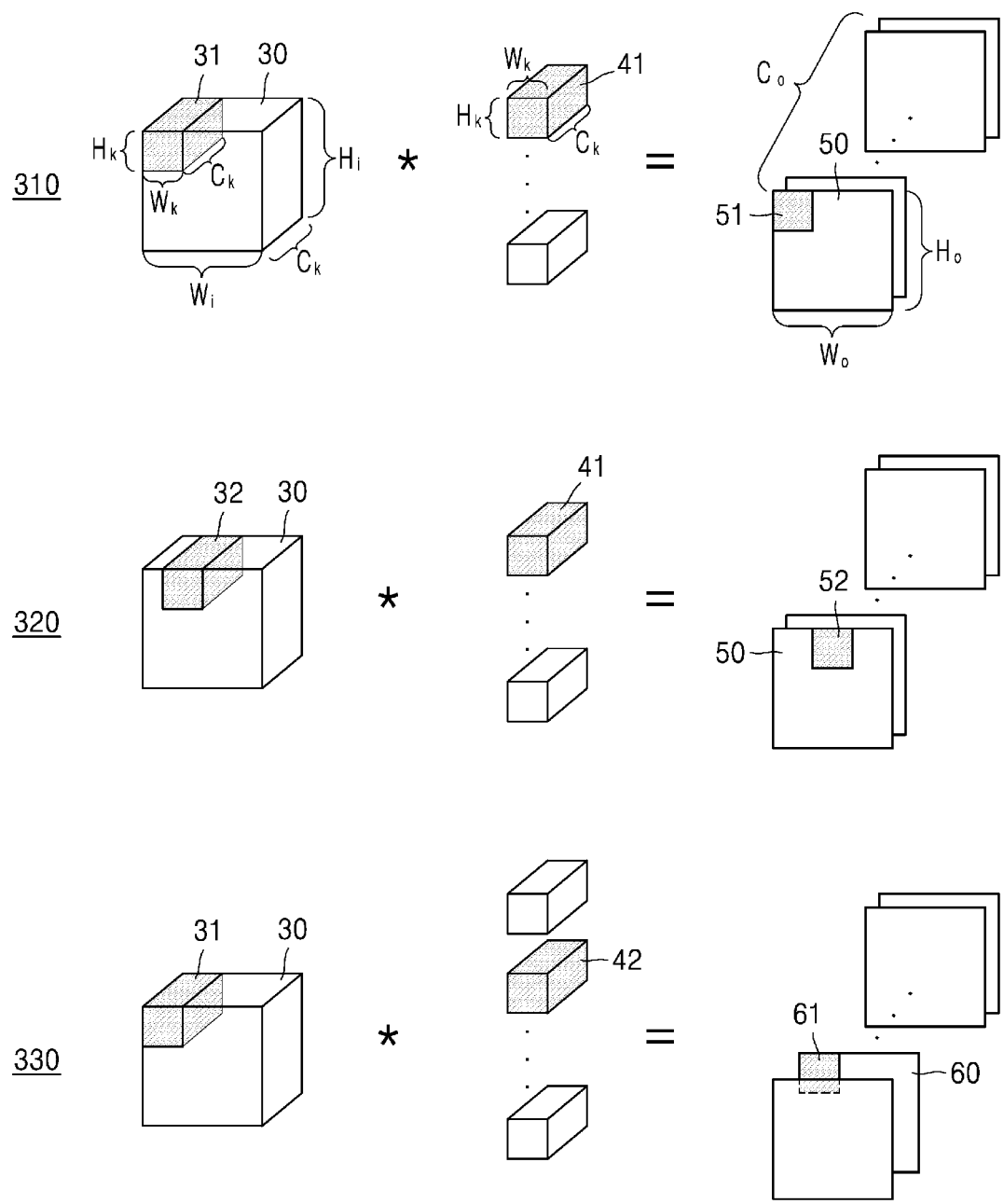
FIG. 3 is a view for explaining a process in which a device performs a convolution operation according to an embodiment.

FIG. 3 is a view for explaining a process in which a device performing a convolution operation performs a convolution operation according to an embodiment.

Referring to FIG. 3, the processor 210 may perform a convolution operation through a convolution layer. For example, the convolution layer may obtain input activation data and weight data as input data. The input activation data may be represented as I[Ck][Wi][Hi], which is three-dimensional data. The weight data may be represented as W[Co][Ck][Wk][Hk], which is four-dimensional data. The processor 210 may perform a convolution operation between input activation data and weight data through a convolution layer, and obtain output activation data as output data. The output activation data may be represented as O[Co][Wo][Ho].

The image 310 of FIG. 3 is a view for explaining a process of calculating a convolution operation value for the first pixel 51 on an output activation first plane 50. The processor 210 may obtain the value of the first pixel 51 on the output activation first plane (Wo×Ho) 50 by calculating the dot product between the three-dimensional block (Wk×Hk×Ck), which is the first input activation data 31 in the input activation data 30, and the three-dimensional block (Wk×Hk×Ck), which is the first weight data 41. Here, the value of the pixel 51 may be a convolution value between the first input activation data 31 and the first weight data 41.

The image 320 of FIG. 3 is a view for explaining a process of calculating a convolution operation value for the second pixel 52 on an output activation first plane 50. The processor 210 may move the three-dimensional block (Wk×Hk×Ck), which is the first input activation data 31, by a predetermined stride in the direction of the two-dimensional plane (Wi×Hi) to obtain a three-dimensional block (Wk×Hk×Ck), which is the second input activation data 32 in the input activation data 30. The processor 210 may obtain a value of a second pixel 52 on the output activation first plane (Wo×Ho) 50 by calculating the dot product between the three-dimensional block (Wk×Hk×Ck), which is the second input activation data 32, and the three-dimensional block (Wk×Hk×Ck), which is the first weight data 41.

The processor 210 may perform operations to obtain a convolution operation value for the first pixel 51 and a convolution operation value for the second pixel 52 in parallel on the output activation first plane 50. In addition, the processor 210 moves the three-dimensional block (Wk×Hk×Ck) within the input activation data 30 by a predetermined stride in the direction of the two-dimensional plane (Wi×Hi) to repeatedly perform an inner operation between the obtained predetermined input activation data and the three-dimensional block (Wk×Hk×Ck), which is the first weight data 41, thereby obtaining pixel values for all pixels on the output activation first plane (Wo×Ho) 50.

In addition, the processor 210 may obtain pixel values for all pixels on the output activation second plane (Wo×Ho) 60 on the output activation three-dimensional coordinates (Wo×Ho×Co) through the same manner as a method of obtaining pixel values for all pixels on the output activation first plane (Wo×Ho) 50.

The image 330 of FIG. 3 is a view for explaining a process of calculating a convolution operation value for the first pixel 61 on an output activation second plane 60. The processor 210 may obtain the value of the first pixel 61 on the output activation second plane (Wo×Ho) 60 by calculating the dot product between the three-dimensional block (Wk×Hk×Ck), which is the first input activation data 31 in the input activation data 30, and the three-dimensional block (Wk×Hk×Ck), which is the second weight data 42.

In addition, operations for obtaining pixel values for all pixels on the output activation second plane (Wo×Ho) 60 and pixel values for all pixels on the output activation first plane (Wo×Ho) 50 can be performed in parallel. The processor 210 may obtain pixel values on all output activation planes, thereby obtaining pixel values on the output activation three-dimensional coordinates (Wo×Ho×Co).

FIG. 4 is a view for explaining a method of accelerating a convolution operation of data quantized with 8 bits according to an embodiment.

Referring to the image 410 of FIG. 4, the processor 210 may perform a multiplication and accumulation (MAC) operation on 32-bit inputs A, B, and C. The processor 210 may generate a 64-bit output D by calculating A×B+C=D for 32-bit inputs A, B, and C. Here, the processor 210 may obtain one output D by performing one MAC operation.

Referring to the image 420 of FIG. 4, the processor 210 may obtain inputs A, B, and C as 32-bit vectors composed of four 8-bit data. The processor 210 may perform an 8-bit single instruction multiple data (SIMD) operation. The processor 210 performs an 8-bit SIMD operation to calculate A[i] XB[i]+C[i]=D[i] (but i=0, 1, 2, 3) for inputs A, B, and C, which are 32-bit vectors of 4 8-bit data, in parallel, thereby obtaining a 64-bit vector D of four 16-bit data. Here, the processor 210 quantizes the 32-bit data into 8 bits and performs a SIMD operation, thereby improving the speed of data processing four times than when performing the MAC operation.

Figure 5:
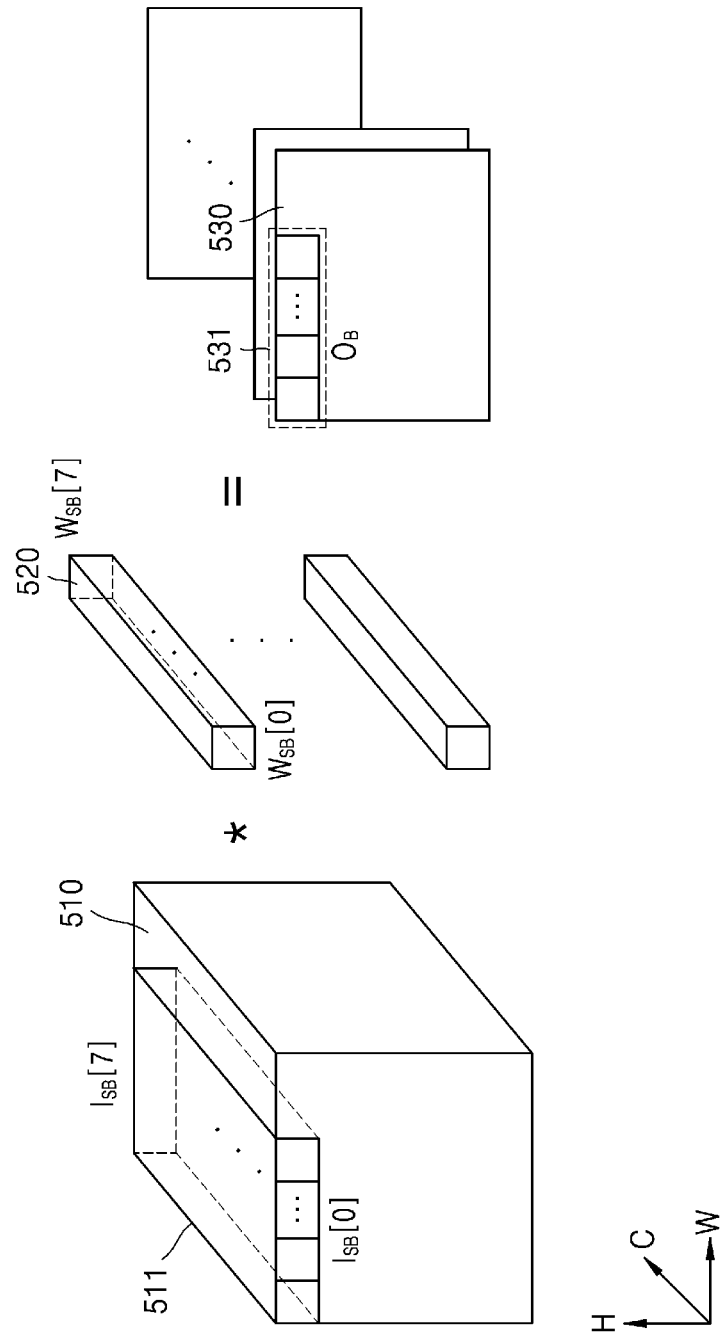
FIG. 5 is a diagram for explaining a method of dividing an input activation block and a weight block in a channel direction and performing a convolution operation using the divided sub-blocks according to an embodiment.

FIG. 5 is a view for explaining a method of dividing an input activation block and a weight block in a channel direction and performing a convolution operation using the divided sub-blocks according to an embodiment.

FIG. 5 is a view for explaining a method of a processor 210 to perform a convolution operation using a SIMD MAC operation.

For example, the processor 210 may obtain the first input activation block 511 ($I_B \in R^{16 \times 1 \times 8}$) in the input activation block 510. The processor 210 may obtain eight sub-blocks ($I_{SB}[0]$ to $I_{SB}[7]$) by dividing the first input activation block 511 ($I_B \in R^{16 \times 1 \times 8}$) in the channel direction. Also, the processor 210 may obtain the first weight block 520 ($W_B \in R^{1 \times 1 \times 8}$). The processor 210 may obtain eight sub-blocks $W_{SB}[0]$ to $W_{SB}[7]$ by dividing the first weight block 520 ($W_B \in R^{1 \times 1 \times 8}$) in the channel direction. The processor 210 may perform SIMD MAC operation between 8 input activation sub-blocks $I_{SB}[0]$ to $I_{SB}[7]$ and 8 weight sub-blocks $W_{SB}[0]$ to $W_{SB}[7]$, thereby obtaining a subtotal of 16 pixels ($O_B=O_B+I_{SB}[i] \times W_{SB \times 16}[i]$, i=0, 1, 2, 3, 4, 5, 6, 7). The processor 210 may obtain a convolution value for 16 pixels 531 by repeatedly performing a SIMD MAC operation on all channels. In addition, the processor 210 may obtain a convolution value for the output activation data 530 through a convolution operation between the input activation block 510 and the first weight block 520. Meanwhile, while performing the operation, the processor 210 may use $W_{SB \times n}$ generated as a vector by copying n weight blocks $W_{SB}$.

FIG. 6 is a view for explaining a method in which a processor 210 performs a convolution operation through an 8-bit SIMD MAC operation according to an embodiment.

For example, it is assumed that the pipeline of the processor 210 can process 128 bits of output at a time. When the processor 210 performs an operation to load or store 16-bit data, the processor 210 may load or store 8 data at a time. Meanwhile, while performing the 8-bit SIMD MAC operation, the processor 210 may use $W_{SB \times 8}$ generated as a vector by copying 8 weight blocks $W_{SB}$.

Referring to line 2-3 of the code 610 of FIG. 6, the processor 210 may load 16 pixels ($O_B \in R^{16 \times 1 \times 1}$) of the first output activation.

Referring to line 4 of the code 610, the processor 210 may load a sub-block $I_{SB}$ [i] [0] to $I_{SB}$[i] [15] of the first input activation block used for the convolution operation.

Referring to lines 5-6 of code 610, the processor 210 may perform multiplication between the sub-block $I_{SB}$ [i] of the first input activation block and the weight sub-block $W_{SB}$ [i], and may perform a MAC operation ($O_B=O_B+I_{SB}[i] \times W_{SB \times 16}$ [i]) that adds a subtotal of 16 pixels of the first output activation block. The processor 210 may perform MAC ($I_{SB}$ [i], $WS_{B \times 16}$[i], $O_B$[i]), and store the performed result in $O_B$[i].

Referring to lines 7-8 of the code 610, the processor 210 may store a subtotal of 16 pixels ($O_B \in R^{16 \times 1 \times 1}$) of the first output activation block.

Therefore, since 7 instructions are repeated 8 times per loop, a total of 56 cycles are required.

Figure 7:
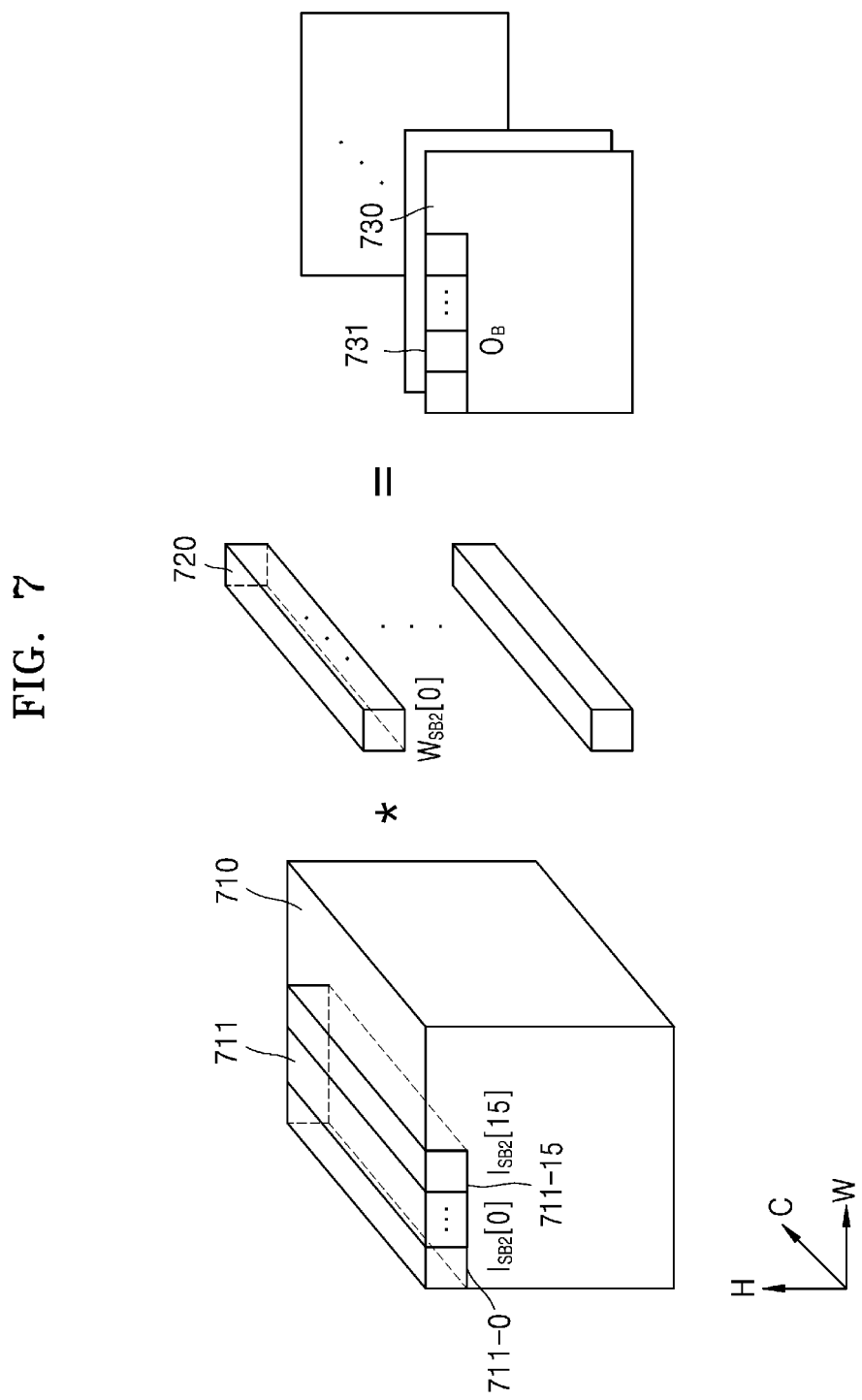
FIG. 7 is a view for explaining a method of performing a convolution operation using sub blocks, in which an input activation block is divided in a width direction and sub blocks in which a weight block is divided according to an embodiment.

FIG. 7 is a view for explaining a method of performing a convolution operation using sub-blocks in which an input activation block is divided in a width direction and sub-blocks in which a weight block is divided according to an embodiment.

For example, the processor 210 may obtain the first input activation block 710 ($I_B \in R^{16 \times 1 \times 8}$) in the input activation block 711. The processor 210 divides the first input activation block 711 ($I_B \in R^{16 \times 1 \times 8}$) in the width direction to obtain 16 first input activation sub-blocks 711-0, 711-2, . . . , 711-15 composed of 8-bit data. $I_{SB2}[0](711-0)$, $I_{SB2}[1](711-1)$, $I_{SB2}[2](711-2)$, . . . , $I_{SB2}[15]$ (711-15) may be 16 sub-blocks, each of which is divided in the width direction and composed of 8 bits. $I_{SB2}[0][i]$ to $I_{SB2}[15][i]$ may be data composed of i-th bits of each sub-block.

Also, the processor 210 may obtain the first weight block 720 ($W_B \in R^{1 \times 1 \times 8}$). The processor 210 may obtain one first weight sub-block $W_{SB2}[0]$ from the first weight block 720 ($W_B \in R^{1 \times 1 \times 8}$). $W_{SB2}[j]$ may be a sub-block composed of the j-th bit of the data of the first weight sub-block. The processor 210 may perform a convolution operation between the 16 first input sub-blocks 711-0, 711-2, . . . , 711-15 and the eight first weight sub-blocks to obtain convolution values of 16 pixels 731 on the output activation plane 730. The convolution operation between the input activation block and the weight block is described in FIG. 8.

FIG. 8 is a view for explaining a method in which a processor 210 performs a convolution operation through a predetermined binary operation according to an embodiment.

Referring to line 1-2 of the code 810 of FIG. 8, the processor 210 may load a subtotal of 16 pixels ($O_B \in R^{16 \times 1 \times 1}$) of the first output activation.

Referring to line 5 of the code 810, the processor 210 may load 16 input activation vectors $I_{SB2}$ [0][i] to $I_{SB2}[15][i]$ composed of i-th bits used for a predetermined convolution operation.

Referring to lines 6-7 of the code 810, the processor 210 may perform an XNOR operation between 16 input activation vectors $I_{SB2}$ [0][i] to $I_{SB2}[15][i]$ and a weight vector $W_{SB2 \times 8}$ [j]. Meanwhile, the processor 210 may use $W_{SB2 \times n}$ generated as a vector by copying n weight blocks $W_{SB2}$ while performing a predetermined convolution operation. The processor 210 may obtain M0 and M1 as a result of performing the XNOR operation. Each of M0 and M1 may be 64-bits (8×8). When the processor 210 is capable of 128-bit processing, the processor 210 may perform an XNOR operation for obtaining M0 and an XNOR operation for obtaining M1 in parallel.

Referring to lines 8-9 of the code 810, the processor 210 may perform a popcount operation on the result of the XNOR operation. Each of P0 and P1 may be 64-bits (8×8). When the processor 210 is capable of 128-bit processing, the processor 210 may perform a popcount operation for obtaining P0 and a popcount operation for obtaining P1 in parallel.

Referring to lines 10-11 of the code 810, the processor 210 may perform a MAC operation using a popcount operation value and a distance vector. The distance vector D[i][j] may be a value in which d[i]×d[j] is calculated, as described in the block 1250 of FIG. 12. In addition, the processor 210 may obtain $D_{x8}$[i][j] generated as a vector by copying 8 D[i][j], and perform a MAC operation using the popcount operation value and $D_{x8}$[i][j].

Referring to lines 12-13 of the code 810, the processor 210 may store a subtotal of 16 pixels ($O_B \in R^{16 \times 1 \times 1}$) of the first output activation block.

For example, if the bit of input activation data is 2 bits and the bit of weight data is 1 bit, since 5 instructions (the operations of lines 5-11 and 6-6 of the code 810 in FIG. 8 are processed in parallel, and the operations of lines 8-9 are processed in parallel) are repeated 2 times per loop, and 4 instructions are performed to load and save the output activation data, it takes a total of 14 (5×2+4=14) cycles. Accordingly, the performance of the convolution operation by the code 810 of FIG. 8 can be improved by about 4 times compared to the performance of the convolution operation by the code 610 of FIG. 6.

In addition, when the bit of input activation data is 3 bits and the bit of weight data is 1 bit, a total of 19 (5×3+4=19) cycles are required. In this case, the performance of the convolution operation can be improved by about 2.9 times.

In addition, when the bit of input activation data is 2 bits and the bit of weight data is 2 bit, a total of 24 (5×2×2+4=24) cycles are required. In this case, the performance of the convolution operation can be improved by about 2.3 times.

Figure 9:
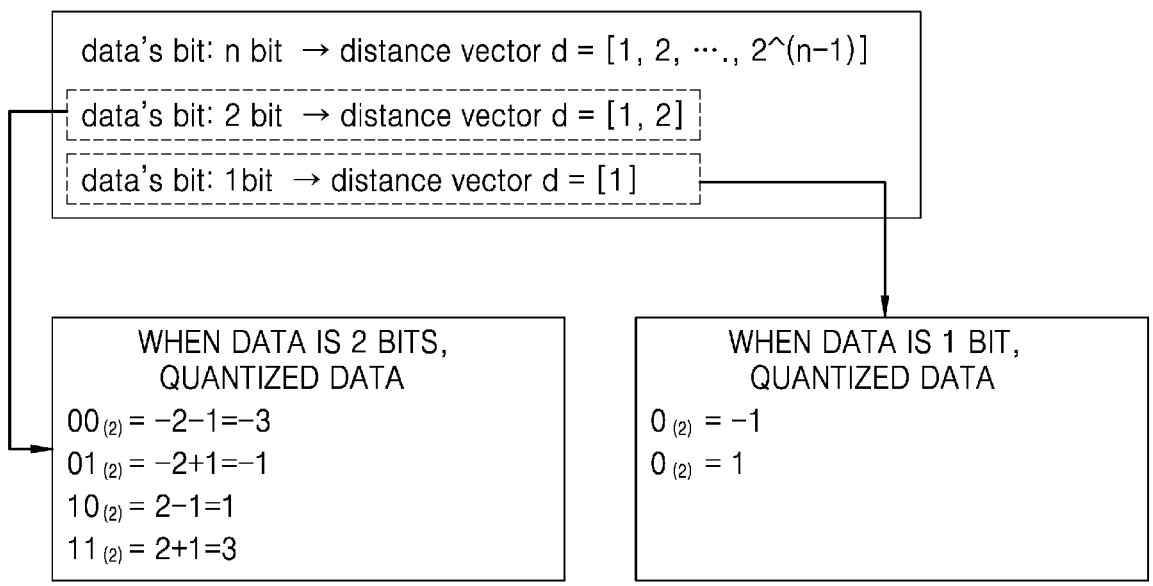
FIG. 9 is a view for explaining a method of obtaining quantized data based on a number of bits and a distance vector of data according to an embodiment.

FIG. 9 is a view for explaining a method of obtaining quantized data based on a number of bits and a distance vector of data according to an embodiment.

The processor 210 may map a binary number represented by a predetermined bit to quantized data based on a distance vector having a distance equal to a predetermined bit of data. For example, referring to the block 910, when the data is n bits, the distance vector is $[1, 2, \ldots, 2^{n-1}]$. When the data is 2 bits, the distance vector may be [1, 2]. Further, when the data is 1 bit, the distance vector may be [1].

Referring to the block 920, when data is 2 bits, binary numbers represented by 2 bits may be $00_{(2)}$, $01_{(2)}$, $10_{(2)}$, or $11_{(2)}$. The processor 210 may obtain quantized data corresponding to a binary number represented by 2 bits based on a sum of values obtained by multiplying each component of the distance vector by 1 or −1. For example, when the value of the first component of the binary number represented by 2 bits is 0, the value of the component of the distance vector corresponding to the first component may be multiplied by −1. In addition, when the value of the second component of the binary number represented by 2 bits is 1, the value of the component of the distance vector corresponding to the second component may be multiplied by 1.

Accordingly, when the binary number represented by 2 bits is $00_{(2)}$, the processor 210 may obtain −2 by multiplying the first component value of distance vector 2 by −1 because the value of the first bit is 0. Since the value of the 0th bit is 0, the processor 210 may obtain −1 by multiplying 1, which is the 0th component value of the distance vector, by −1. The processor 210 may obtain −3 by adding −2 and −1. If the binary number is $00_{(2)}$, the processor 210 can obtain the quantized data of −3.

In the same way, if the binary number is $01_{(2)}$, the processor 210 may obtain quantized data of −1. If the binary number is $10_{(2)}$, the processor 210 can obtain the quantized data of 1. If the binary number is $11_{(2)}$, the processor 210 can obtain the quantized data of 3.

Referring to block 930, when data is 1 bit, binary numbers represented by 1 bit may be $0_{(2)}$ or $1_{(2)}$. The processor 210 may obtain quantized data corresponding to a binary number represented by 2 bits based on a value obtained by multiplying each component of the distance vector by 1 or −1.

Therefore, if the binary number is $0_{(2)}$, the processor 210 can obtain the quantized data of −1. If the binary number is $1_{(2)}$, the processor 210 can obtain the quantized data of 1.

FIG. 10 is a view for explaining a process of obtaining an inner operation value when input activation data is 1 bit and weight data is 1 bit according to an embodiment.

Referring to the block 1010, if the input activation data and the weight data are 1 bit, the distance vector for each of the input activation data and the weight data may be [1].

Referring to the block 1020, the processor 210 may obtain input activation data quantized with 1 bit and weight data quantized with 1 bit. For example, the input activation data $A_{original}$ quantized with 1 bit may be [1, 1, 1, 1, −1, −1, 1, −1] composed of 8 vectors. The weight data $W_{original}$ quantized with 1 bit may be [−1, 1, −1, 1, −1, 1, −1, 1] composed of 8 vectors.

Referring to the block 1030, the processor 210 may binarize the input activation data $A_{original}$ and the weight data $W_{original}$, respectively, to obtain a binarization input activation data vector $A_{bin}$ and a binarization weight vector $W_{bin}$.

For example, when 1-bit data is quantized by a distance vector (d=[1]), the processor 210 can binarize −1, which is the quantized data, to $0_{(2)}$, and binarize 1, which is the quantized data, to $1_{(2)}$.

Accordingly, the processor 210 binarizes [1, 1, 1, 1, −1, −1, 1, −1], which is the input activation data $A_{original}$ to obtain [1, 1, 1, 1, 0, 0, 1, 0], which is a binarization input activation data vector $A_{bin}$. Also, the processor 210 binarizes [−1, 1, −1, 1, −1, 1, −1, 1], which is the weight data $W_{original}$ to obtain [0, 1, 0, 1, 0, 1, 0, 1], which is a binarization weight vector $W_{bin}$.

Referring to the block 1040, the processor 210 may obtain a first operation vector by performing an XNOR operation between the binarization input activation data vector $A_{bin}$ and the binarization weight vector $W_{bin}$. The first operation vector M may be [0, 1, 0, 1, 1, 0, 0, 0]. After performing the XNOR operation, the processor 210 may obtain a second operation value P by performing a popcount operation on the first operation vector M. Here, the second operation value P is 3.

Referring to the block 1050, the processor 210 may perform an inner operation between the input activation data $A_{original}$ and the weight data $W_{original}$ based on the distance vector corresponding to the second operation value P and the first operation vector M.

Specifically, the processor 210 may obtain a third operation value by multiplying the second operation value P by 2 and subtracting the length of the input activation data $A_{original}$. Here, the length of the input activation data $A_{original}$ is 8, and the third operation value is −2. The processor 210 may perform an inner operation between the input activation data $A_{original}$ and the weight data $W_{original}$ by multiplying the third calculation value by a distance vector d[0]=1. The inner operation value is −2.

It can be seen that −2, which is the inner operation value calculated in the block 1050, is the same as the result of the inner operation between the input activation data $A_{original}$ and the weight data $W_{original}$.

FIG. 11 is a view for explaining a process of obtaining an inner operation value when input activation data is 2 bits and weight data is 1 bit according to an embodiment.

Referring to the block 1110, if the input activation data is 2 bits, the distance vector $d_a$ for the input activation data may be [1, 2]. If the weight data is 1 bit, the distance vector $d_w$ for the weight data may be [1].

Referring to the block 1120, the processor 210 may obtain input activation data quantized with 2 bits and weight data quantized with 1 bit. For example, the input activation data $A_{original}$ quantized with 2 bits may be [1, 3, 3, 1, −3, −1, 1, −1] composed of 8 vectors. The weight data $W_{original}$ quantized with 1 bit may be [−1, 1, −1, 1, −1, 1, −1, 1] composed of 8 vectors.

Referring to the block 1130, the processor 210 may binarize the input activation data $A_{original}$ and the weight data $W_{original}$, respectively, to obtain a binarization input activation data vector $A_{bin}$ and a binarization weight vector $W_{bin}$.

For example, when 1-bit data is quantized by a distance vector (d=[1]), the processor 210 can binarize −1, which is the quantized data, to $0_{(2)}$, and binarize 1, which is the quantized data, to $1_{(2)}$. For example, when 2-bit data is quantized by a distance vector (d=[1,2]), the processor 210 can binarize −3, which is the quantized data, to $00_{(2)}$, binarize −1, which is the quantized data, to $01_{(2)}$, binarize 1, which is the quantized data, to $10_{(2)}$, and binarize 3, which is the quantized data, to $11_{(2)}$.

Accordingly, the processor 210 binarizes [1, 3, 3, 1, −3, −1, 1, −1], which is the input activation data $A_{original}$ to obtain [$10_{(2)}$, $11_{(2)}$, $11_{(2)}$, $10_{(2)}$, $00_{(2)}$, $01_{(2)}$, $10_{(2)}$, $01_{(2)}$], which is a binarization input activation data vector $A_{bin}$. The processor 210 may obtain the i-th binarization input activation vector (0≤i≤1, i is an integer) composed of i-th bits in the binarization input activation data vector $A_{bin}$. Here, the binary input activation vector $A_{bin}$ [0] composed of the 0th bit is [0, 1, 1, 0, 0, 1, 0, 1]. In addition, the binarization input activation vector $A_{bin}$ [1] composed of the first bit is [1, 1, 1, 1, 0, 0, 1, 0]. Also, the processor 210 binarizes [−1, 1, −1, 1, −1, 1, −1, 1], which is the weight data $W_{original}$ to obtain [0, 1, 0, 1, 0, 1, 0, 1], which is a binarization weight vector $W_{bin}$.

Referring to the block 1140, the processor 210 performs an XNOR operation between the i-th binarization input activation data vector ($A_{bin}$[i], i=0, 1) and the binarization weight vector $W_{bin}$ to obtain the first operation vector (M[k], k=0, 1). The number of first operation vectors M[k] is a value obtained by multiplying the number of bits in which the input activation data is quantized and the number of bits in which the weight value data is quantized. Here, the number of first operation vectors M[k] is 2×1=2. The processor 210 may obtain M[0] by calculating XNOR between $A_{bin}$ [0] and $W_{bin}$. Here, M[0] is [1, 1, 0, 0, 1, 1, 1, 1]. In addition, the processor 210 may obtain M[1] by calculating XNOR between $A_{bin}$ [1] and $W_{bin}$. Here, M[1] is [0, 1, 0, 1, 1, 0, 0, 0]. After performing the XNOR operation, the processor 210 performs a popcount operation on each of the two first operation vectors M[k] to obtain two second operation values (P(k), k=0, 1). P(0) is 6 and P(1) is 3.

Referring to the block 1150, the processor 210 may perform an inner operation between the input activation data $A_{original}$ and the weight data $W_{original}$ based on the distance vector corresponding to the second operation value P and the first operation vector M.

Specifically, the processor 210 may obtain two third operation values by multiplying the second operation value (P(k), i=0, 1) by 2 and subtracting the length of the input activation data $A_{original}$. The processor 210 sums values of each of the third operation values multiplied by a distance vector (d[i], i=0, 1) based on obtaining the third operation value to perform an inner operation between the input activation data $A_{original}$ and the weight data $W_{original}$. Referring to the block 1150, the inner operation value is 0.

It can be seen that 0, which is the inner operation value calculated in the block 1150, is the same as the result of the inner operation between the input activation data $A_{original}$ and the weight data $W_{original}$.

FIG. 12 is a view for explaining a process of obtaining an inner operation value when input activation data is 2 bits and weight data is 2 bits according to an embodiment.

Referring to the block 1210, if the input activation data and the weight data are 2 bits, the distance vector $d_a$ for the input activation data is [1, 2], and the distance vector $d_w$ for the weight data is [1, 2].

Referring to the block 1220, the processor 210 may obtain input activation data quantized with 2 bits and weight data quantized with 2 bit. For example, the input activation data $A_{original}$ quantized with 2 bits may be [1, 3, 3, 1, −3, −1, 1, −1] composed of 8 vectors. The weight data $W_{original}$ quantized with 2 bits may be [−1, 1, −1, −3, 3, 1, 3, 1] composed of 8 vectors.

Referring to the block 1230, the processor 210 may binarize the input activation data $A_{original}$ and the weight data $W_{original}$, respectively, to obtain a binarization input activation data vector $A_{bin}$ and a binarization weight vector $W_{bin}$.

For example, as described with reference to FIG. 11, when 2-bit data is quantized by a distance vector (d=[1,2]), the processor 210 can binarize −3, which is the quantized data, to $00_{(2)}$, binarize −1, which is the quantized data, to $01_{(2)}$, binarize 1, which is the quantized data, to $10_{(2)}$, and binarize 3, which is the quantized data, to $11_{(2)}$.

Accordingly, the processor 210 binarizes [1, 3, 3, 1, −3, −1, 1, −1], which is the input activation data $A_{original}$ to obtain [$10_{(2)}$, $11_{(2)}$, $11_{(2)}$, $10_{(2)}$, $00_{(2)}$, $01_{(2)}$, $10_{(2)}$, $01_{(2)}$], which is a binarization input activation data vector $A_{bin}$. The processor 210 may obtain the i-th binarization input activation vector (0≤i≤1, i is an integer) composed of i-th bits in the binarization input activation data vector $A_{bin}$. Here, the binary input activation vector $A_{bin}$ [0] composed of the 0th bit is [0, 1, 1, 0, 0, 1, 0, 1]. In addition, the binarization input activation vector $A_{bin}$ [1] composed of the first bit is [1, 1, 1, 1, 0, 0, 1, 0].

In the same manner, the processor 210 binarizes [−1, 1, −1, −3, 3, 1, 3, 1], which is the weight data $W_{original}$ to obtain [$01_{(2)}$, $10_{(2)}$, $00_{(2)}$, $11_{(2)}$, $10_{(2)}$, $\mathbf{11}_{(2)}$, $10_{(2)}$,], which is a binarization weight vector $W_{bin}$. The processor 210 may obtain a j-th binarization weight vector (0≤j≤1, j is an integer) composed of the j-th bit from the binarization weight vector $W_{bin}$. Here, the binarization weight vector $W_{bin}$ [0] composed of the 0th bit is [1, 0, 1, 0, 1, 0, 1, 0]. Further, the binarization weight vector $W_{bin}$ [1] composed of the first bit is [0, 1, 0, 0, 1, 1, 1, 1].

Referring to the block 1240, the processor 210 performs an XNOR operation between the i-th binarization input activation data vector ($A_{bin}$[i], i=0, 1) and the binarization weight vector ($W_{bin}$[j], j=0, 1) to obtain the first operation vector (M[k], k=0, 1, 2, 3). The number of first operation vectors M[k] is a value obtained by multiplying the number of bits in which the input activation data is quantized and the number of bits in which the weight value data is quantized. Here, the number of first operation vectors M[k] is 2×2=4.

The processor 210 may obtain M[0] by calculating XNOR between $A_{bin}$ [0] and $W_{bin}$[0]. Here, M[0] is [0, 0, 1, 1, 0, 0, 0, 0]. The processor 210 may obtain M[1] by calculating XNOR between $A_{bin}$ [0] and $W_{bin}$[1]. Here, M[1] is [1, 1, 0, 1, 0, 1, 0, 1]. The processor 210 may obtain M[2] by calculating XNOR between $A_{bin}$ [1] and $W_{bin}$[0]. Here, M[2] is [1, 0, 1, 0, 0, 1, 1, 1]. The processor 210 may obtain M[3] by calculating XNOR between $A_{bin}$ [1] and $W_{bin}$[1]. Here, M[3] is [0, 1, 0, 0, 0, 0, 1, 0].

After performing the XNOR operation, the processor 210 performs a popcount operation on each of the four first operation vectors (M[k], k=0, 1, 2, 3) to obtain four second operation values (P(k), k=0, 1, 2, 3). P(0) is 2, P(1) is 5, P(2) is 5, and P(3) is 2.

Referring to the block 1250, the processor 210 may perform an inner operation between the input activation data $A_{original}$ and the weight data $W_{original}$ based on the distance vector corresponding to the second operation value P and the first operation vector M.

Specifically, the processor 210 may obtain four third operation values by multiplying the second operation value (P(k), i=0, 1, 2, 3) by 2 and subtracting the length of the input activation data $A_{original}$. The processor 210 sums values of each of the third operation values multiplied by a distance vector (d[i], i=0, 1, d[j], j=0, 1) based on obtaining the third operation value to perform an inner operation between the input activation data $A_{original}$ and the weight data $W_{original}$. Referring to the block 1250, the inner operation value is −12.

It can be seen that −12, which is the inner operation value calculated in the block 1250, is the same as the result of the inner operation between the input activation data $A_{original}$ and the weight data $W_{original}$.

Figure 13:
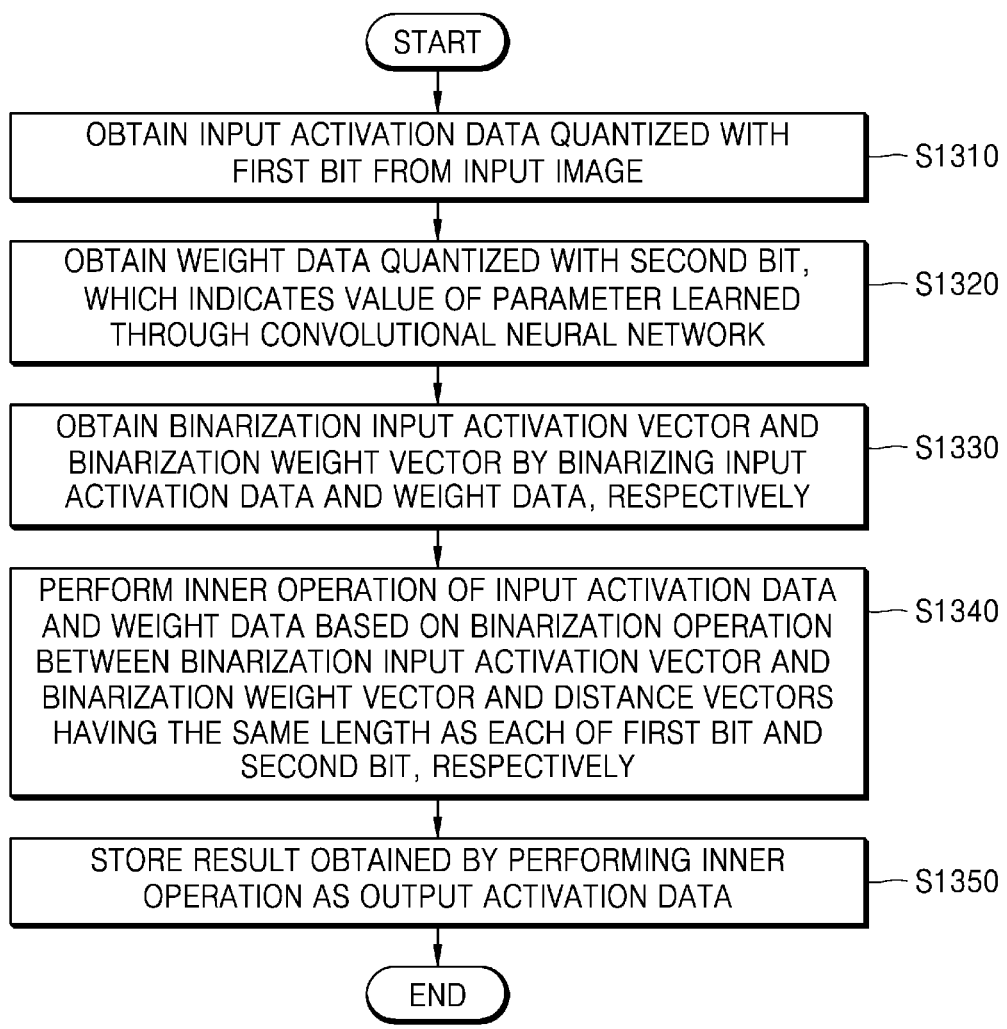
FIG. 13 is a flowchart illustrating a method of performing a convolution operation according to an embodiment.

FIG. 13 is a flowchart illustrating a method of performing a convolution operation according to an embodiment.

Referring to FIG. 13, in operation S1310, a device performing a convolution operation (hereinafter, a convolution operation device 10) may obtain input activation data quantized with a first bit from an input image.

For example, the convolution operation device 10 may map the binary number represented by the first bit to the quantized data based on the first distance vector having the same distance as the first bit. The convolution operation device 10 may store the mapped result in the memory 220. The convolution operation device 10 may obtain input activation data quantized with the first bit from the image based on the mapped result and the unit of the convolution operation.

In operation S1320, the convolution operation device 10 may obtain weight data quantized with a second bit indicating a value of a parameter learned through CNN.

For example, the convolution operation device 10 may map the binary number represented by the second bit to the quantized data based on the second distance vector having the same distance as the second bit. The convolution operation device 10 may store the mapped result in the memory 220. The convolution operation device 10 may obtain weight data quantized with the second bit from the value of the parameter learned through the CNN based on the mapped result and the unit of the convolution operation.

In operation S1330, the convolution operation device 10 may binarize each of the input activation data and the weight data to obtain a binarization input activation vector and a binarization weight vector.

For example, the convolution operation device 10 may binarize a component in the input activation data, and obtain an i-th binarization input activation vector (0≤i≤n−1, i is an integer, and the first bit is n-bit) composed of i-th bits in each of the binarized components.

In addition, the convolution operation device 10 may binarize components in the weight data, and obtain a j-th binarization weight vector (0≤j≤m−1, j is an integer, and the second bit is an m-bit) composed of j-th bits in each of the binarized components.

In operation S1340, the convolution operation device 10 may perform a predetermined binary operation between the binarization input activation vector and the binarization weight vector. The convolution operation device 10 may obtain distance vectors having the same length as each of the first bit and the second bit. The convolution operation device 10 may perform an inner operation of input activation data and weight data based on predetermined binary arithmetic and distance vectors between the binarization input activation vector and the binarization weight vector.

The convolution operation device 10 may perform an XNOR operation between the i-th binarization input activation vector and the j-th binarization weight vector to obtain n×m first operation vectors. The convolution operation device 10 may obtain n×m second operation values by performing a popcount operation on n×m first operation vectors. The convolution operation device 10 may perform an inner operation of input activation data and weight data based on a distance vector corresponding to n×m second operation values and n×m first operation vectors.

Specifically, the convolution operation device 10 may obtain n×m third calculation values by multiplying each of the n×m second calculation values by 2 and subtracting the length of the input activation data. The convolution operation device 10 multiplies the values of the distance vectors based on obtaining each of the n×m third calculation values with the n×m third calculation values, and sums the n×m multiplication values, thereby performing the inner operation of the input activation data and the weight data.

The convolution operation device 10 may obtain a predetermined number of output activation data by performing an inner operation on a predetermined number of input activation data obtained from the input image.

The convolution operation device 10 may apply a predetermined number of output activation data output from the first layer on the CNN as input activation data of the second layer on the CNN.

In operation S1350, the convolution operation device 10 may store the result obtained by the inner operation as output activation data.

Moreover, embodiments of the above-described method of performing a convolution operation may be provided in the form of a computer program stored in a computer-readable storage medium to perform a method of performing a convolution operation in the convolution operation device 10. Computer-readable storage media may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage, optical data storage devices, hard disk, solid-state disk (SSD), and devices that can store instructions or software, related data, data files, and data structures, and provide instructions or software, related data, data files, and data structures to a processor or computer so that the processor or computer can execute instructions.

In addition to dedicated hardware for performing convolution operations through convolutional neural network, general processors can also increase the accuracy and speed of convolution operations using certain binary operations.

Although the above-mentioned embodiments are described through the limited embodiments and the drawings and various modifications and transformations are possible by those skilled in the art on the basis of the above descriptions. For example, although the described techniques are performed in a different order than the described method, and/or components such as the described system, structure, device, and circuit are coupled or combined in a different form than the described method or are replaced or substituted by other components or equivalents, an appropriate result may be achieved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of performing a convolutional operation in a convolutional neural network, the method comprising:
   obtaining input activation data quantized with a first bit-width, from an input image, based on a first distance vector having a number of components that is the same as the number of bits of the first bit-width, wherein quantizing the input activation data is performed based on a sum of values obtained by multiplying values of components of the first distance vector by a set of preset values;
   obtaining weight data quantized with a second bit-width, representing a value of a parameter learned through the convolutional neural network, based on a second distance vector having a number of components that is the same as the number of bits of the second bit-width, wherein quantizing the weight data is performed based on a sum of values obtained by multiplying values of components of the second distance vector by a set of preset values;
   binarizing each of the input activation data and the weight data to obtain a binarization input activation vector and a binarization weight vector, respectively, wherein binarizing comprises transforming data into vectors of binary numbers;
   performing an inner operation based on binary operation values, derived from components of the binarization input activation vector and the binarization weight vector, and the first and second distance vectors, wherein the inner operation is performed by:
      multiplying each of a result of a predetermined operation using the binary operation values by a corresponding component of the first distance vector and a corresponding component of the second distance vector; and
      summing the multiplication result values; and
   storing a result obtained by the inner operation as output activation data.

2. The method of claim 1, wherein obtaining the input activation data comprises:
   mapping a binary number represented by the first bit-width to quantized data based on the first distance vector; and
   obtaining input activation data quantized with the first bit-width from the input image based on the mapped result and a unit of the convolution operation.

3. The method of claim 1, wherein obtaining the weight data comprises:
   mapping a binary number represented by the second bit-width to quantized data based on the second distance vector; and
   obtaining weight data quantized with the second bit-width from a value of a parameter learned through the convolutional neural network based on the mapped result and a unit of the convolution operation.

4. The method of claim 1, wherein obtaining the binarization input activation vector and the binarization weight vector by binarizing each of the input activation data and the weight data comprises:
   binarizing components in the input activation data and obtaining an i-th binarization input activation vector ($0 \leq i \leq n-1$, i is an integer, and the first bit-width is n-bit) comprising i-th bits in each of the binarized components; and
   binarizing components in the weight data, and obtaining a j-th binarization weight vector ($0 \leq j \leq m-1$, j is an integer, and the second bit-width is an m-bit) comprising j-th bits in each of the binarized components.

5. The method of claim 4, wherein performing the inner operation comprises:
   performing an XNOR operation on the i-th binarization input activation vector and the j-th binarization weight vector to obtain n×m first operation vectors;
   performing a popcount operation on the n×m first operation vectors to obtain n×m second operation values; and
   performing an inner operation with respect to the input activation data and the weight data based on the n×m second operation values and a distance vector corresponding to the n×m first operation vectors.

6. The method of claim 5, wherein performing the inner operation with respect to the input activation data and the weight data based on the n×m second operation values and the distance vector corresponding to the n×m first operation vectors comprises:
   multiplying each of the n×m second operation values by 2, and performing an operation to subtract a length of the input activation data from n×m values obtained by multiplying each of the n×m second operation values by 2, to obtain n×m third operation values; and
   multiplying the values of distance vectors based on obtaining each of the n×m third operation values with the n×m third operation values, and summing the n×m multiplication result values.

7. The method of claim 1, further comprising obtaining a predetermined number of output activation data by performing the inner operation on a predetermined number of input activation data obtained from the input image.

8. The method of claim 7, further comprising applying the predetermined number of output activation data outputted from a first layer on the convolutional neural network as input activation data of a second layer of the convolutional neural network.

9. A device for performing a convolutional operation in a convolutional neural network, the device comprising:
- a memory in which at least one program is stored; and
- a processor configured to perform a convolution operation in a convolutional neural network by executing the at least one program,
- wherein the processor is further configured to:
- obtain input activation data quantized with a first bit-width, from an input image, based on a first distance vector having a number of components that is the same as the number of bits of the first bit-width, wherein quantizing the input activation data is performed based on a sum of values obtained by multiplying values of components of the first distance vector by a set of preset values;
- obtain weight data quantized with a second bit-width, representing a value of a parameter learned through the convolutional neural network, based on a second distance vector having a number of components that is the same as the number of bits of the second bit-width, wherein quantizing the weight data is performed based on a sum of values obtained by multiplying values of components of the second distance vector by a set of preset values;
- binarize each of the input activation data and the weight data to obtain a binarization input activation vector and a binarization weight vector, respectively, wherein the processor binarizes by transforming data into vectors of binary numbers;
- perform an inner operation based on binary operation values, derived from components of the binarization input activation vector and the binarization weight vector, and the first and second distance vectors, wherein the processor performs the inner operation by:
  - multiplying each of a result of a predetermined operation using the binary operation values by a corresponding component of the first distance vector and a corresponding component of the second distance vector, and
  - summing the multiplication result values; and
- store a result obtained by the inner operation as output activation data.

10. The device of claim 9, wherein the processor is further configured to:
- map a binary number represented by the first bit-width to quantized data based on the first distance vector, and
- obtain input activation data quantized with the first bit-width from the input image based on the mapped result and a unit of the convolution operation.

11. The device of claim 9, wherein the processor is further configured to:
- map a binary number represented by the second bit-width to quantized data based on the second distance vector, and
- obtain weight data quantized with the second bit-width from a value of a parameter learned through the convolutional neural network based on the mapped result and a unit of the convolution operation.

12. The device of claim 9, wherein the processor is further configured to:
- binarize components in the input activation data and obtains an i-th binarization input activation vector ($0 \leq i \leq n-1$, i is an integer, and the first bit-width is n-bit) comprising i-th bits in each of the binarized components, and
- binarize components in the weight data, and obtain a j-th binarization weight vector ($0 \leq j \leq m-1$, j is an integer, and the second bit-width is an m-bit) comprising j-th bits in each of the binarized components.

13. The device of claim 12, wherein the processor is further configured to:
- perform an XNOR operation on the i-th binarization input activation vector and the j-th binarization weight vector to obtain n×m first operation vectors,
- perform a popcount operation on the n×m first operation vectors to obtain n×m second operation values, and
- perform an inner operation with respect to the input activation data and the weight data based on the n×m second operation values and a distance vector corresponding to the n×m first operation vectors.

14. The device of claim 13, wherein the processor is further configured to:
- multiply each of the n×m second operation values by 2, and perform an operation to subtract a length of the input activation data from n×m values obtained by multiplying each of the n×m second operation values by 2, to obtain n×m third operation values, and
- multiply the values of distance vectors based on obtaining each of the n×m third operation values with the n×m third operation values, and sum the n×m multiplication result values.

15. A computer program stored on a non-transitory machine readable medium for executing a method of performing a convolution operation in a convolutional neural network in combination with a processor, the method comprising:
- loading an address to store output activation data representing a result obtained by performing an inner operation with respect to input activation data quantized with a first bit-width based on a first distance vector having a number of components that is the same as the number of bits of the first bit-width, wherein quantizing the input activation data is performed based on a sum of values obtained by multiplying values of components of the first distance vector by a set of preset values, and weight data quantized with a second bit-width based on a second distance vector having a number of components that is the same as the number of bits of the second bit-width, wherein quantizing the weight data is performed based on a sum of values obtained by multiplying values of components of the second distance vector by a set of preset values;
- loading a binarization input activation vector in which components in the input activation data are binarized and a binarization weight vector in which components in the weight data are binarized, wherein binarizing comprises transforming data into vectors of binary numbers;
- performing an inner operation based on binary operation values, derived from components of the binarization input activation vector and the binarization weight vector, and the first and second distance vectors, wherein the inner operation is performed by:
  - multiplying each of a result of a predetermined operation using the binary operation values by a corresponding component of the first distance vector and a corresponding component of the second distance vector; and
  - summing the multiplication result values; and
- storing the result obtained by the inner operation as the output activation data at the loaded address.

* * * * *